Sept. 29, 1953  H. B. SEITZINGER  2,653,731
CAN OPENING AND DISPENSING CONTAINER
Filed Dec. 16, 1947  2 Sheets-Sheet 1

INVENTOR.
Harry B. Seitzinger
BY
ATTORNEYS

Sept. 29, 1953     H. B. SEITZINGER     2,653,731
CAN OPENING AND DISPENSING CONTAINER Filed Dec. 16, 1947     2 Sheets-Sheet 2

INVENTOR.
Harry B. Seitzinger

Patented Sept. 29, 1953

2,653,731

UNITED STATES PATENT OFFICE 2,653,731

CAN OPENING AND DISPENSING CONTAINER

Harry B. Seitzinger, Elmira, N. Y.

Application December 16, 1947, Serial No. 791,996

1 Claim. (Cl. 222—86)

My invention is a novel can opening and sanitary dispensing container for the purpose of holding a can of liquid in operative position with both breather and dispenser holes punched in the top thereof.

The primary object of my invention is the provision of a dispensing container which will protect the contents of the can from impurities during intervals of disuse, and which will make the changing and piercing of the cans both quick and easy.

Another object of my invention is the provision of an attractive looking container which will completely enclose the can, the container itself being of light weight and durable construction.

Still another object is the provision of a device which will automatically eject the emptied can from the container when the latter is opened to insert a new can.

Other objects of my invention will become apparent during the following discussion of the accompanying drawings wherein.

Figure 2:
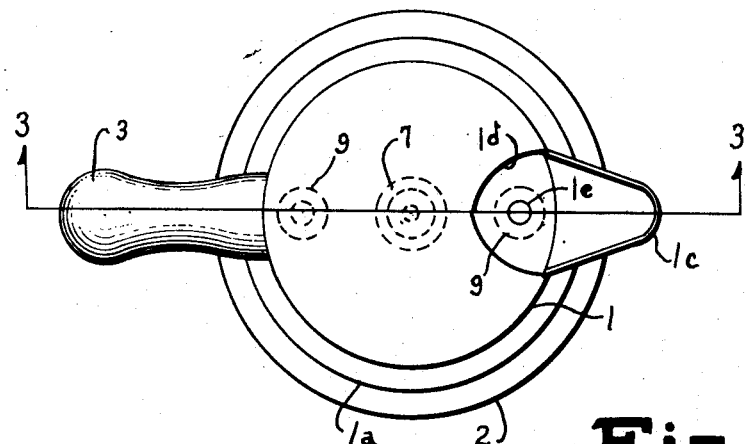
Fig. 2 is a plan view.
Figure 1:
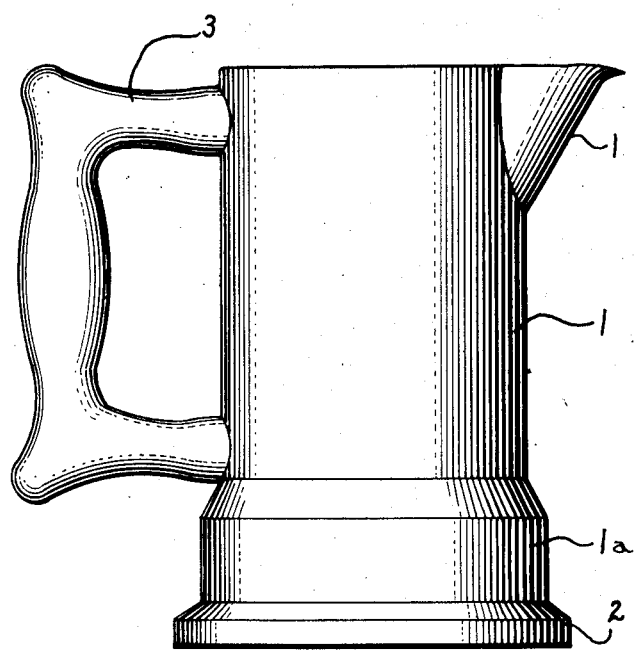
Figure 1 is a side elevation of the container showing the outside appearance thereof.
Figure 3:
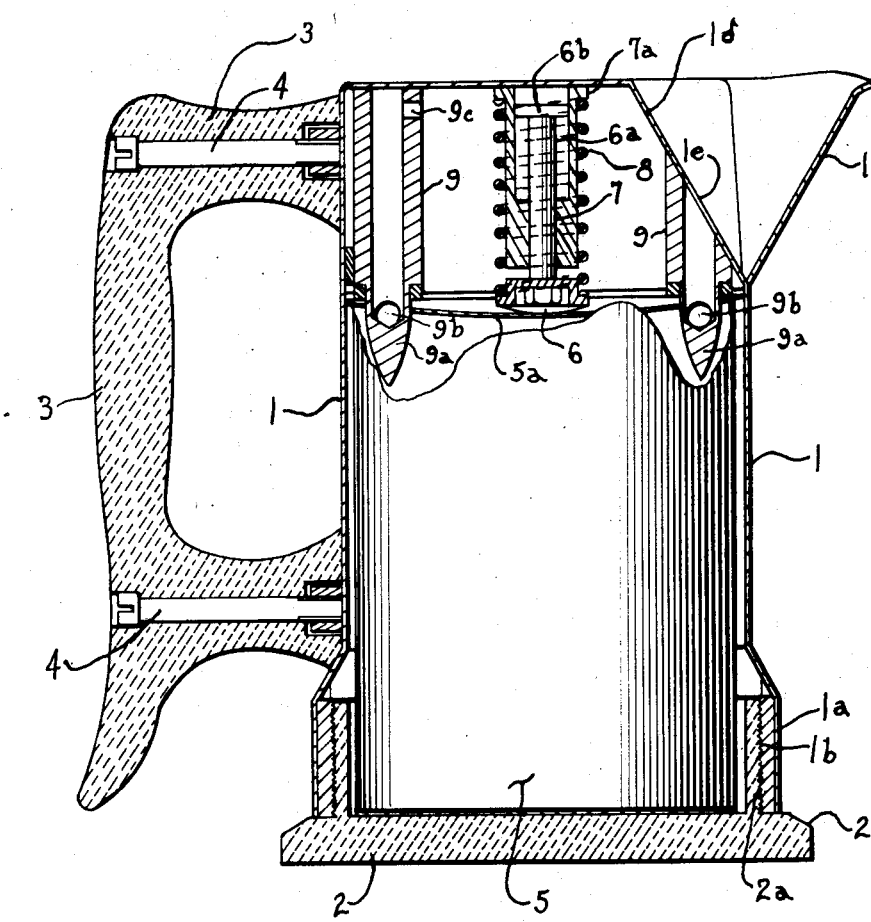
Fig. 3 is a section view taken along line 3—3 of Fig. 2.

Referring to the drawings, one physical embodiment of the invention comprises an outer casing 1 enlarged at the bottom 1a and having internal threads 1b therein engaging external threads 2a of the base 2. Fixed to one side of casing 1 is handle 3 mounted as with bolts 4 to casing 1, and opposite said handle at the top of the casing is an outwardly extending pouring spout 1c facing an indentation 1d in the casing 1.

The liquid containing can 5 to be punched and held in this container is held in operative position within casing 1 by base 2 thus opposing the downward thrust of plunger 6 on the upper surface 5a of the can. Extending upward from plunger 6 is a shaft 6a free to slide vertically in bearing bracket 7, there being an enlargement 6b on the top of shaft 6a to limit the downward motion of the shaft in the bearing 7. The compression of coil spring 8 between the plunger 6 and the top 7a of bracket supplies the downward thrust of the plunger on the top surface 5a of the can.

A pair of downwardly extending tubular members 9 carrying at their lower ends cutters 9a are mounted within casing 1, said cutters being so located as to pierce the upper surface 5a of the can in two places, one adjacent the handle 3 and the other directly below the pouring spout indentation 1d. A hole 9b in each of the cutters 9a provides communication between the internal bores of the tubular members 9 and the liquid within the can 5, cutters 9a being so shaped as to provide a liquid-tight seal when wedged and held in the incisions in the top surface 5a of the can. Near the upper end of the tubular member 9 adjacent the handle 3 is a small breather vent 9c to admit air into the can 5, whereas the upper end of the tubular member 9 adjacent the pouring spout communicates with a hole 1e in indented surface 1d, the contents of the can being poured out through this hole 1e to the spout 1c when the device is being used as a dispenser.

In operation, the can 5 is inserted in the bottom of the casing 1, and the base 2 is screwed into position. The screwing up of the base forces the can upward against the action of plunger 6 and the resistance of cutters 9a which pierce the top of the can and provide communicating passages from the inside of the can to the spout 1c and the breather vent 9c, respectively. When the can has been emptied it may easily be removed by unscrewing base 2 and thus allowing the can to be ejected from casing 1 by the downward force exerted on the top of the can by plunger 6.

I do not limit my invention to the form shown in the drawings, for obviously changes may be made within the scope of the claim.

I claim:

A can opening and dispensing container, comprising a casing having an open bottom and a closed top and adapted to enclose a can; a handle secured to the side of the casing; a pouring spout at the side opposite from the handle embracing an inclined indentation in the casing; downwardly extending tubular members in the top of the casing having cutters at their lower ends adapted to pierce the upper surface of the can, one member being disposed below the said indentation; means for forcing the can upwardly within the casing against said cutters; said members being hollow above the cutters and having holes adjacent their lower ends communicating with the interiors of the members to provide communication between the interiors of the members and the interior of the can; and the member having a breather vent therein to admit air from below the closed top of the casing into the can; said interior of the other member communicating through a hole in the indentation with said spout; and plunger means in the casing normally urging the can towards the open lower end comprising a guide bracket in the upper end of the casing; a plunger slidably mounted in said bracket and adapted to engage the top of the can; spring means disposed between the bracket and plunger for yieldably urging the plunger toward the can; and means for limiting the outward movement of the plunger.

HARRY B. SEITZINGER.

References Cited in the file of this patent

UNITED STATES PATENTS

| Number | Name | Date |
|---|---|---|
| Re. 14,268 | Day | Mar. 13, 1917 |
| 1,072,588 | Duncan | Sept. 9, 1913 |
| 1,075,723 | Peltason | Oct. 14, 1913 |
| 1,142,940 | Davis et al. | June 15, 1915 |
| 1,635,563 | Sanford | July 12, 1927 |
| 1,745,456 | Shuler | Feb. 4, 1930 |
| 2,024,898 | Weltner | Dec. 17, 1935 |
| 2,038,775 | Weber | Apr. 28, 1936 |
| 2,159,897 | Karzenski | May 23, 1939 |
| 2,255,847 | James | Sept. 16, 1941 |
| 2,306,550 | Mailey | Dec. 29, 1942 |
| 2,350,836 | Sonneborn et al. | June 6, 1944 |